US008925289B2

(12) United States Patent
Lecointe

(10) Patent No.: US 8,925,289 B2
(45) Date of Patent: Jan. 6, 2015

(54) MACHINE FOR FILLING ARTIFICIAL INSEMINATION STRAWS WITH SEMEN

(75) Inventor: Pascal Lecointe, Saint-Gregoire (FR)

(73) Assignee: Eurl Cryo Vet, Quebriac (FR)

( * ) Notice: Subject to any disclaimer, the term of this patent is extended or adjusted under 35 U.S.C. 154(b) by 1167 days.

(21) Appl. No.: 12/310,915

(22) PCT Filed: Sep. 10, 2007

(86) PCT No.: PCT/EP2007/059465
§ 371 (c)(1),
(2), (4) Date: Mar. 12, 2009

(87) PCT Pub. No.: WO2008/031793
PCT Pub. Date: Mar. 20, 2008

(65) Prior Publication Data
US 2010/0000627 A1 Jan. 7, 2010

(30) Foreign Application Priority Data

Sep. 13, 2006 (FR) ..................................... 06 07982

(51) Int. Cl.
*B65B 1/04* (2006.01)
*B65B 43/50* (2006.01)
(Continued)

(52) U.S. Cl.
CPC .............. *A61D 19/024* (2013.01); *B29C 65/08* (2013.01); *B29C 66/1122* (2013.01); *B29C 66/43* (2013.01); *B29C 66/80* (2013.01); *B29C 66/81423* (2013.01); *B29C 66/843* (2013.01); *B29C 57/10* (2013.01); *B29K 2027/06* (2013.01); *B29L 2023/007* (2013.01); *B29C 66/8322* (2013.01)
USPC ................... 53/282; 53/281; 53/283; 53/250; 53/249; 53/504; 53/55

(58) Field of Classification Search
CPC ...... B65B 3/003; B65G 47/00; B65G 47/847; A61D 19/00; A61D 19/02
USPC ........ 53/236, 249, 250, 264, 281–284, 284.6, 53/52, 55, 504; 198/715, 750.11, 867.02, 198/867.05, 867.06, 867.08, 867.11, 198/867.12, 803.3, 803.14, 418; 156/358, 156/499, 580, 580.1; 221/241, 255–257, 221/263
See application file for complete search history.

(56) References Cited

U.S. PATENT DOCUMENTS 2,575,155 A * 11/1951 Orelup et al. ................. 552/221
2,986,211 A * 5/1961 Hartmann et al. ............ 162/391
(Continued)

FOREIGN PATENT DOCUMENTS

CH 533 542 3/1973
FR 1 379 273 12/1963
(Continued)

OTHER PUBLICATIONS

International Search Report issued Nov. 7, 2007, in application No. PCT/EP2007/059465.

*Primary Examiner* — Gloria R Weeks
(74) *Attorney, Agent, or Firm* — Foley & Lardner LLP

(57) ABSTRACT

This machine comprises a hopper (2) for storing empty straws, a station (5) for filling the straws, and a transfer device (3), such as a rotary barrel, which is provided with notches for receiving and holding the straws (p) and with which straws removed from the hopper are conveyed to the filling station (5); it is designed to process at least two categories of straws of different diameters, notches being subdivided into at least two distinct series that can be used selectively, the elements (90) of one of the two series being designed to adapt to straws of large diameter, while the elements (91) of the other series are designed to adapt to straws of small diameter. Machine that can be used in more than one way in the packaging of semen for artificial insemination, particularly of cows.

18 Claims, 14 Drawing Sheets

(51) Int. Cl.
*A61D 19/02* (2006.01)
*B29C 65/08* (2006.01)
*B29C 65/00* (2006.01)
*B29C 57/10* (2006.01)
*B29K 27/06* (2006.01)
*B29L 23/00* (2006.01)

(56) References Cited

U.S. PATENT DOCUMENTS

| | | | |
|---|---|---|---|
| 3,390,891 A * | 7/1968 | Stichhan | 279/23.1 |
| 3,452,505 A * | 7/1969 | Hoag | 53/452 |
| 3,475,130 A * | 10/1969 | Baruch | 422/64 |
| 3,568,735 A * | 3/1971 | Lancaster | 141/238 |
| 3,687,175 A * | 8/1972 | Babey | 141/59 |
| 3,805,784 A * | 4/1974 | Alter | 604/403 |
| 3,819,194 A * | 6/1974 | Grevich et al. | 279/23.1 |
| 3,860,107 A * | 1/1975 | Cioni et al. | 198/867.14 |
| 3,877,430 A * | 4/1975 | Wieder | 604/232 |
| 3,880,210 A * | 4/1975 | Randolph et al. | 141/175 |
| 3,918,920 A * | 11/1975 | Barber | 422/560 |
| 3,970,120 A * | 7/1976 | Whitecar | 141/1 |
| 4,007,367 A * | 2/1977 | Rusteberg et al. | 219/385 |
| 4,118,914 A * | 10/1978 | Shields | 53/282 |
| 4,363,205 A * | 12/1982 | Hollander, Jr. | 53/434 |
| 4,409,046 A * | 10/1983 | Holzwarth et al. | 156/73.6 |
| 4,446,960 A * | 5/1984 | Zauner et al. | 198/408 |
| 4,459,864 A * | 7/1984 | Cirincione | 73/863.32 |
| 4,478,261 A | 10/1984 | Cassou et al. | |
| 4,570,431 A * | 2/1986 | Igel | 57/275 |
| 4,600,120 A * | 7/1986 | Sabo et al. | 221/107 |
| 4,741,432 A * | 5/1988 | Dekko | 198/803.8 |
| 4,819,789 A * | 4/1989 | Linner | 198/803.8 |
| 4,939,884 A * | 7/1990 | Peters | 53/127 |
| 4,958,667 A * | 9/1990 | Rece et al. | 141/165 |
| 5,055,271 A * | 10/1991 | Golias et al. | 422/63 |
| 5,062,522 A * | 11/1991 | Sagawa et al. | 198/400 |
| 5,067,532 A * | 11/1991 | Lang et al. | 141/329 |
| 5,173,265 A * | 12/1992 | Golias et al. | 422/550 |
| 5,377,815 A * | 1/1995 | Vetter et al. | 198/476.1 |
| 5,431,201 A * | 7/1995 | Torchia et al. | 141/98 |
| 5,735,383 A * | 4/1998 | Abbate et al. | 198/456 |
| 5,868,178 A * | 2/1999 | Lecointe | 141/110 |
| 5,941,366 A * | 8/1999 | Quinlan et al. | 198/465.1 |
| 6,035,904 A * | 3/2000 | Beau et al. | 141/130 |
| 6,274,092 B1 * | 8/2001 | Itoh | 422/562 |
| 6,311,831 B1 * | 11/2001 | van der Griendt et al. | 198/487.1 |
| 6,343,690 B1 * | 2/2002 | Britton et al. | 198/867.06 |
| 6,422,418 B1 * | 7/2002 | Collins et al. | 221/253 |
| 6,520,313 B1 * | 2/2003 | Kaarakainen et al. | 198/369.5 |
| 6,732,486 B2 * | 5/2004 | Saint-Ramon et al. | 53/131.4 |
| 6,745,543 B2 * | 6/2004 | Tillack et al. | 53/374.8 |
| 6,971,506 B2 * | 12/2005 | Hassinen et al. | 198/803.14 |
| 7,047,709 B2 * | 5/2006 | Hamilton | 53/469 |
| 7,146,781 B1 * | 12/2006 | Cole | 53/468 |
| 7,264,113 B2 * | 9/2007 | Hartness et al. | 198/850 |
| 7,377,401 B2 * | 5/2008 | Humphrey | 221/95 |
| 7,421,833 B2 * | 9/2008 | Rothbauer et al. | 53/471 |
| 7,584,837 B2 * | 9/2009 | Roether et al. | 198/717 |
| 7,712,604 B2 * | 5/2010 | Monti | 198/803.8 |
| 7,726,352 B2 * | 6/2010 | Py et al. | 141/11 |
| 2006/0032730 A1 * | 2/2006 | Kaufman et al. | 198/803.7 |
| 2006/0272293 A1 * | 12/2006 | Nelson et al. | 53/444 |
| 2010/0282395 A1 * | 11/2010 | Volger et al. | 156/73.1 |

FOREIGN PATENT DOCUMENTS

| | | |
|---|---|---|
| FR | 2 564 064 | 11/1985 |
| FR | 2 700 313 | 7/1994 |
| FR | 2 727 163 | 5/1996 |

* cited by examiner

MACHINE FOR FILLING ARTIFICIAL INSEMINATION STRAWS WITH SEMEN

The present invention relates to a machine for filling artificial insemination straws with semen.

The semen is animal semen, bovine for example, such as diluted bull sperm.

BACKGROUND OF THE INVENTION

More precisely, the invention relates to the type of machine comprising a hopper for storing empty straws, a filling station for straws, as well as a transport device provided with elements for receiving and holding the straws and capable of conveying straws taken from the hopper to present them at the filling station.

Machines of this type are described for example in documents FR 2,700,313 and U.S. Pat. No. 4,478,261, according to which the transporter is a fluted rotating barrel, and CH 533,542, according to which the transporter is constituted by several likewise fluted mobile endless bands.

The grooves ensure reception of the straws coming from the hopper, their transfer to the filling station, and being held during filling.

The transporters function step by step, such that a straw, or a group of straws, is immobilised at the filling station during this operation.

Such a machine is generally adapted to filling straws whereof one of the two ends, known as distal, is blocked by a stopper initially permeable to air, but capable of becoming watertight when it is soaked in a liquid. The stopper is made for example from polyvinyl alcohol powder intercalated between two buffers of fibrous material.

The filling station comprises means for introducing semen at the opposite end, or "proximal" of the straws, as well as means for suctioning the semen via their distal end, through the porous stoppers.

On contact with the semen, or a certain quantity of non-spermicidal intermediary liquid, in keeping with the ideas of FR 2,810,535, the stopper hardens and becomes impermeable, tightly blocking the distal end.

Located downstream of the filling station is a closing station for the proximal end of the straws, this closing generally being completed by ultrasound welding.

After filling and closing, the straws are released from the transporter and collected in a receptacle ad hoc.

They are then frozen for later use.

Straws being used currently are fine cylindrical tubes, made of flexible and transparent plastic, such as PVC (polyvinyl chloride) in particular.

The majority of straws available on the market has a length of 133 mm, and there are two categories of straws of differing diameters, specifically straws having a diameter of the order of 2 mm (in practice 1.95 mm) and straws having a diameter of the order of 3 mm (in practice 2.85 mm).

BRIEF SUMMARY OF THE INVENTION

A main aim of the invention is to propose a machine of the type described hereinabove of polyvalent character, which is capable of processing both these categories of straws, without the passage from one to the other of the categories requiring significant intervention from the operator.

Another aim of the invention is to propose a compact, reliable machine, easy to use and capable of running at a high rate.

To this end, and according to the invention, this machine is adapted to process at least two categories of straws having different diameters, the elements for receiving and holding the straws with which the transporter is equipped being subdivided into at least two distinct series able to be used selectively, the elements of one of the two series conforming to adapt to straws of large diameter, whereas the elements of the other series conform to adapt to straws of small diameter.

It should be mentioned that a feed device for a machine for filling tubes is already known from document FR 2,564,064. This is a device with chains, capable of transporting tubes of different diameters. For this purpose, the transport chains comprise reception elements constituted by a pair of wafers having variable clearance. When the tube diameter is changed, it is necessary to regulate this clearance by playing on the relative positions of two adjacent chains.

In this known embodiment, all the receiver elements are utilised for transport, irrespective of the diameter of the relevant tubes.

According to other advantageous and non-limiting characteristics of the invention:

said transporter is endless, and each series of elements of a given category is composed of several groups formed from a certain number of adjacent elements, the groups of a given category alternating with those of the other, the filling station being designed to simultaneously fill the batch of straws supported by a group of adjacent elements;

the groups of the two categories have the same number of elements;

said elements are grooves or notches in which the straws are fitted;

the axle spacing between the grooves or the notches is constant over the entire length of the transporter, and independent of its category;

the machine comprises an electric motor controlled by a computer and operating step by step, capable of driving the transporter with successive and repeated phases of advance, at a low pitch, then at a high pitch, of an amplitude multiple that of the low pitch, then a stop phase;

the transporter is a rotating barrel placed at the hopper outlet and constituted by two coaxial discs integral with one another and bearing at their periphery said elements for receiving and holding the straws;

said hopper comprises means for distributing the straws one by one, which are synchronised with the advance of the transporter;

said hopper is removable and comprises identification means of the category of straws it contains, whereas the machine is equipped with detection means for cooperating with said identification means as the hopper is being put in place, so as to automatically determine the category of the straws to be treated;

said detection means are connected to a control and command circuit of the drive motor of the transporter, so as to index the position of the latter on startup, such that the elements for receiving and holding the straws which are adapted to their diameter are active, while the others are inactive;

the machine is adapted to filling straws whereof one of the two ends, the distal end, is blocked by an initially porous stopper, but capable of becoming watertight when it is soaked in a liquid, and this machine comprises a station placed upstream of the filling station, this station being adapted for introducing a small quantity of non-spermicidal and non-adherent liquid into the straws, by their opposite end, the "proximal" end;

said filling station comprises means for introducing semen at said proximal end of the straws, as well as means for suctioning semen and, if required, the small quantity of liquid introduced previously into the straws, this suctioning being carried out via their distal end through the stoppers;

the machine comprises an ultrasound welding station of the proximal end of the straws, located downstream of the filling station;

this welding station comprises a sonotrode connected to an anvil, provided with additional indentations for gripping the proximal end of the straws, these indentations being subdivided into two alternating groups respectively adapted to the welding of small-diameter straws and of large-diameter straws of, control means being provided for shifting the sonotrode and the anvil together to make one of the two groups of indentations active and the other inactive, respective to the category of straws to be processed;

the machine, which comprises a transporter consisting of a rotating barrel placed at the hopper outlet and constituted by two coaxial discs integral with one another, and bearing at their periphery notches for receiving and holding the straws, is provided with two fixed ramps profiled in such way that one ensures extraction of the proximal end of the straws from the notches of one of the discs, just before the straws arrive at the welding station, and the other ensures extraction of the distal end of the straws from the notches of the other disc after the straws have left the welding station, such that the filled and welded straws then drop into a receptacle;

said transporter is a rotating barrel placed at the hopper outlet and constituted by two coaxial discs integral with one another, whereof the mutual clearance is substantially less than the length of the straws, and each bearing at its periphery 64 notches for receiving and holding the straws, each notch comprising a substantially semi-circular base wall and a flared mouthpiece facilitating centring of the straws, said notches being subdivided into two series of 32 notches adapted to different diameters, specifically large notches for receiving straws having an external diameter of the order of 3 mm, and small notches for receiving straws having an external diameter of the order of 2 mm, each series of notches being distributed into eight groups of 4 notches, and the groups of large notches alternating with the groups of small notches, the axle spacing between two adjacent notches being constant over the entire periphery of the disc and independent of the category of notch concerned, this axle spacing being advantageously of the order of 10 mm.

Other characteristics and advantages of the invention will emerge from the following description of a preferred embodiment of the invention.

BRIEF DESCRIPTION OF THE SEVERAL VIEWS OF THE DRAWING(S)

This description is given in reference to the attached diagrams, in which:

FIGS. 19, 19A and 19B are sketches illustrating the receiving, by the barrel, of small-diameter straws at the hopper outlet.

DETAILED DESCRIPTION OF THE INVENTION

Figure 1:
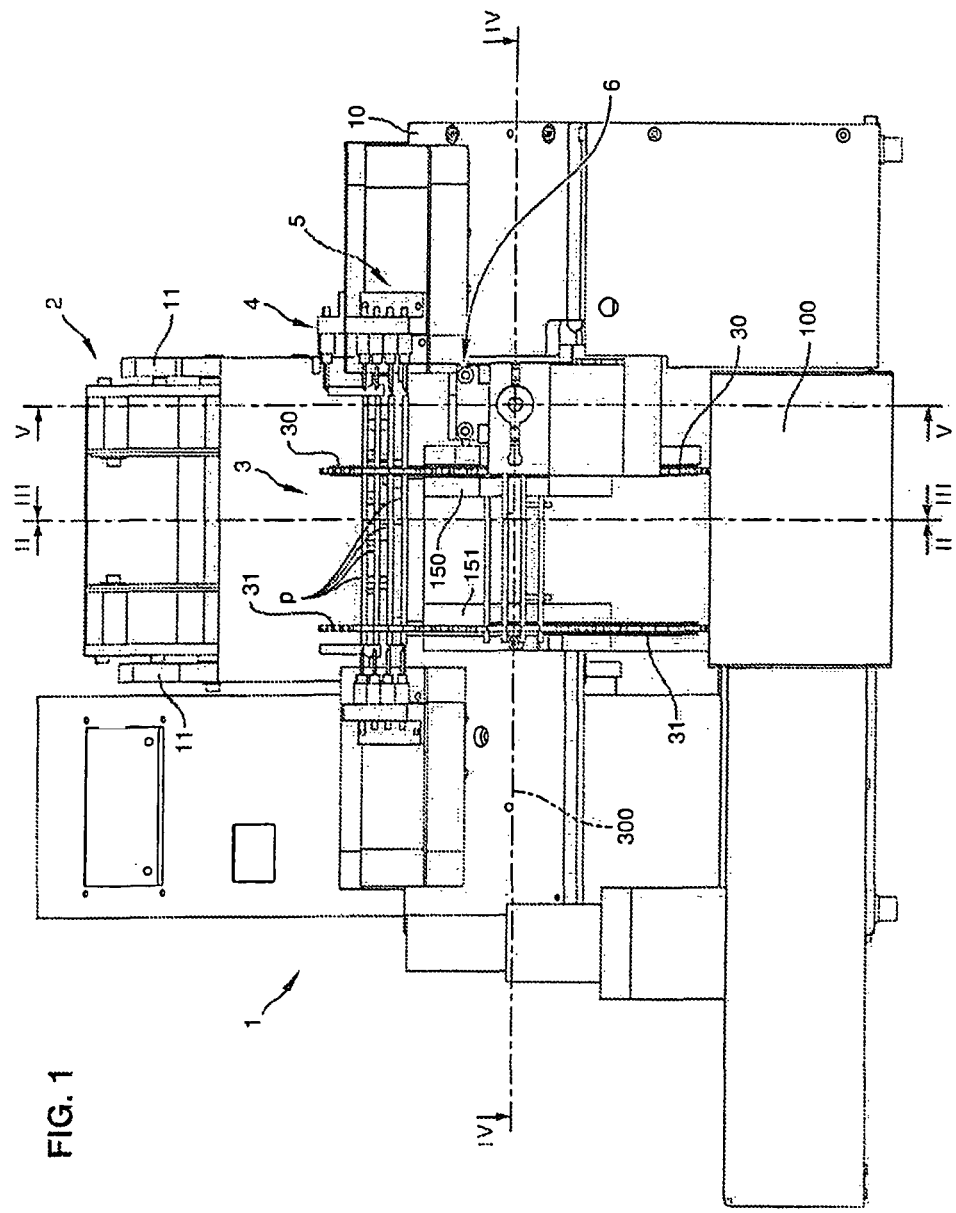
FIG. 1 is a general frontal view of the machine.

The machine 1, such as illustrated especially in FIGS. 1 to 6, comprises a certain amount of apparatus and equipment whereof only the main ones relating directly to the present invention will be described so as not to unnecessarily complicate the description.

It comprises a fixed frame 10 for supporting a removable and interchangeable hopper 2 containing straws, a rotating transporter barrel 3, a station 4 for introduction of a non-spermicidal liquid to the straws, a station 5 for filling the straws with semen, an ultrasound welding station 6 for one end of the straws and a receptacle 100 for collecting the filled and welded straws.

The hopper 2 designed to contain straws to be filled has the general shape of a rectangular parallelepiped box, open at the top, while the base of which is embodied by a pair of inclined parallel rectilinear guides (flat rods) 20. The width of this box is very slightly greater than the length of the straws the latter being placed in batches into the hopper on the guides 20, perpendicularly to the latter.

Figure 14:
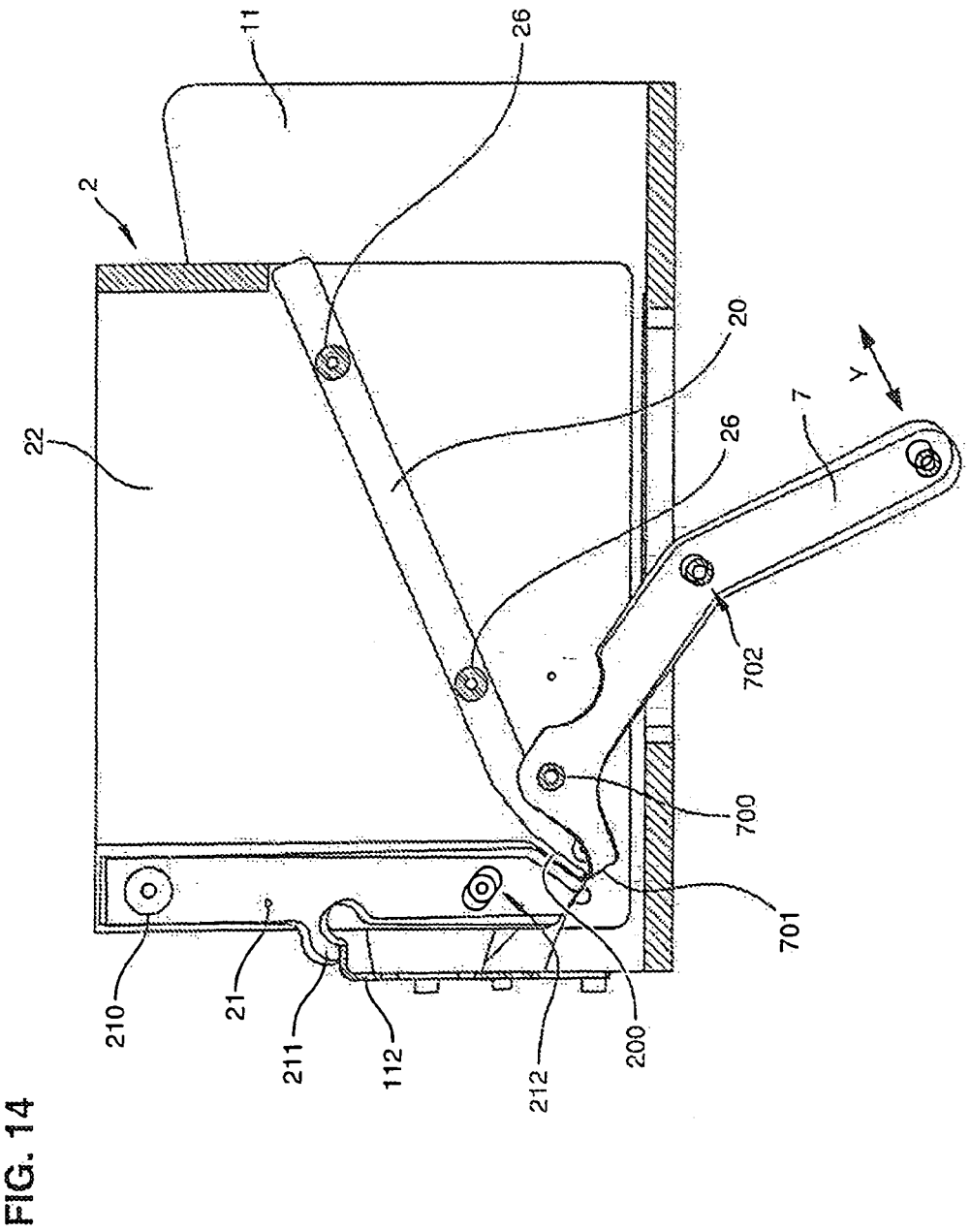
FIG. 14 is a side elevation, in vertical section, of a hopper in place on the machine, this view intended to show the blocking means of the outlet channel of the hopper.

In FIG. 14, reference numeral 26 designates two transversal rods serving as cross bars for the guides 20 which ensure they are fixed to the side walls 22 of the hopper.

Mounted at the front of the hopper (to the left in FIG. 14), is a pair of vertical flat rods 21 each placed in the same vertical plane as one of the guides. Each rod 21 is articulated in its upper part about an axis 210 borne by a wall 22. A lug/hole guiding system 212 limits the range of this articulation. In its central zone, the lever 21 is fitted with a forward facing shoulder 211.

The front end portion of each guide 20 is more inclined than its main part, and the lower end portion of each lever 21 is chamfered, such that its lower edge has the same inclination.

When the hopper is withdrawn from the machine, the lever 21 is inclined slightly to the rear relative to the vertical, under the effect of its own weight, and its lower chamfered edge comes to rest against the front portion of the guide 20.

This prevents the straws (which have a tendency to descend along the rods) from being taken out of the hopper.

However, for a hopper to be placed on the machine, it is positioned between two lateral cheeks 11 solid with the frame 10. Outside each of its side walls 22, the hopper 2 is fitted with a pair of centring and holding lugs 220, 221, adapted to lodge in flared notches, open to the top, made in said cheeks 11.

Figure 7:
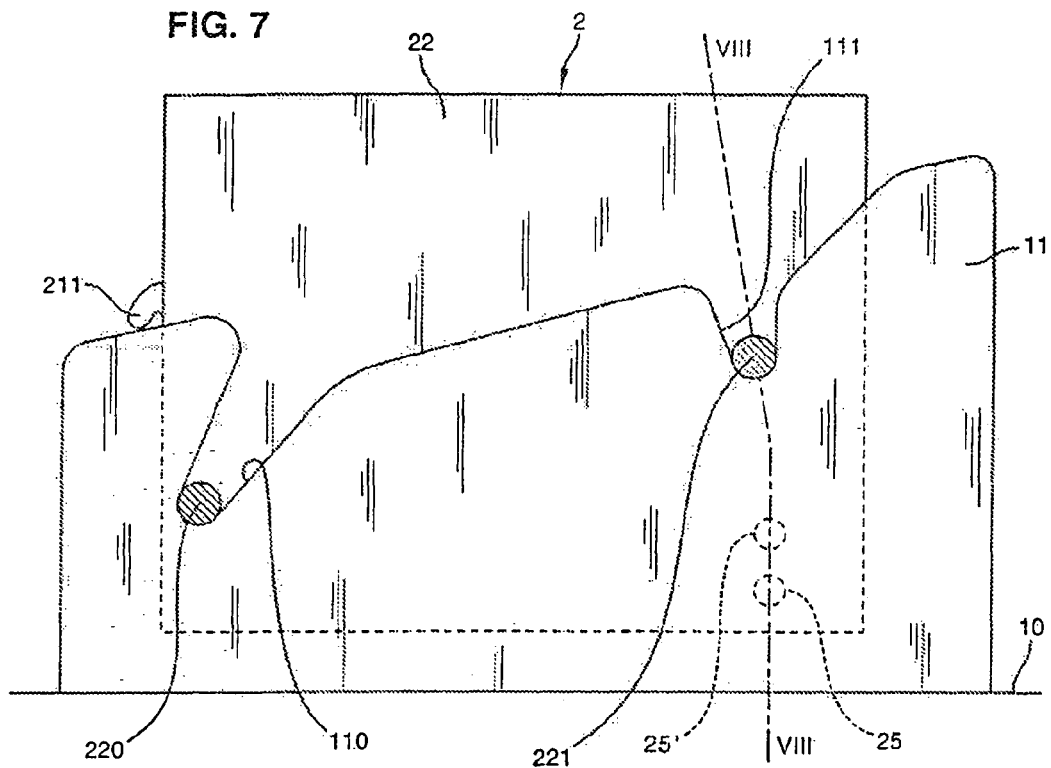
FIG. 7 is a detail showing a side elevation of the hopper put in place on the machine.

In this way, after it has been put in place, the hopper is retained by these lugs which are supported at the base of the notches, in a well-defined position, illustrated in FIG. 7.

During this placing, the two shoulders 211 come to be supported against the upper edge of a transversal partition 112 solid with the frame, the effect of which is to slightly correct the levers 21, and release the hopper outlet; in fact, the levers 21 are vertical and their chamfered lower edge is parallel to the front part of a guide 20, making a small channel 200 in which the straws can descend and be placed against one another in single file.

The two channels 200 form an exit spout for the straws.

However, the exiting of the straws is now controlled by a pair of levers 7, connected by cross bars, each articulated about a transversal axis 700 solid with the frame; they have a free upper end 701 in the shape of a finger.

A control member 70, such as a jack or an electromagnet, is connected to a crossbeam which joins the lower ends of this set of levers and can impart to them an oscillating movement, symbolised by the double arrow Y in FIG. 14, to make them pivot together in one direction or the other about the axis 700.

Lug/hole guide systems 702 limit the range of this articulation.

Each lever 7 is positioned towards the interior of the hopper, relative to a guide 20, quite close to the latter.

According to the state of the control member 70 (retracted or extended), the fingers 701 block or, on the contrary, release the two exit channels 200 of the hopper.

This control member is controlled such that the straws can be released individually only (one by one), at a determined frequency.

One of the side walls 22 of the hopper is fitted, at the level of its lower rear angle, on its inner face, with a pin 25 acting as identification means of the category of the straws which it contains.

Figure 8:
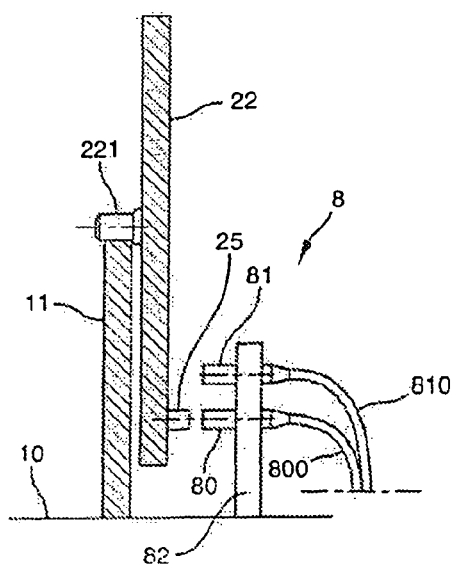
FIGS. 8 and 9 are detailed sectional views according to the broken plane VIII-VIII of FIG. 7, relating to two hoppers containing straws of different categories.
Figure 9:
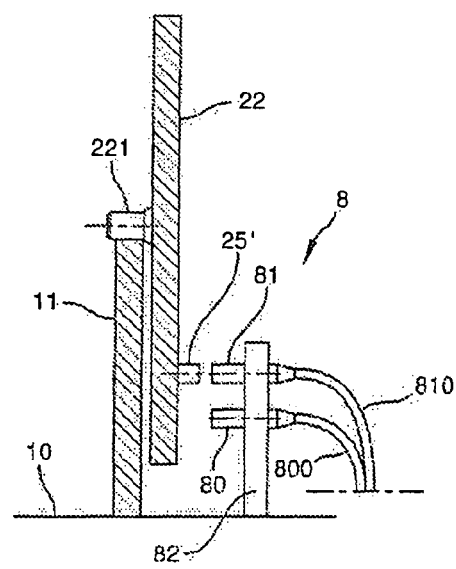

As is evident from FIGS. 8 and 9, the position of the pin, designated by reference numeral 25' in FIG. 9, is different to that of the pin 25 of FIG. 8.

In the embodiment illustrated, they are offset in height.

One position is made use of when the hopper 2 contains small-diameter straws (of the order of 2 mm); the other position is utilised when the hopper contains large-diameter straws (of the order of 3 mm).

A detection device 8 comprising a pair of detectors 80, 81 borne by a support 82 is mounted on the frame 10. These are fibreoptic detectors, placed in opposite positions likely to be occupied by the pins 25 and 25' respectively.

Optical cables 800, 810 are connected to a command and control circuit of the machine to address a corresponding signal to it; this circuit is therefore informed automatically of the category of the straws to be processed.

Machine 1 is equipped with a transporter 3 which consists of a rotating barrel constituted by a pair of coaxial discs 30, 31, having a horizontal and transversal axis 300. They are borne by a hub 301 driven in rotation, via a transmission belt 302, by an electric motor M (see especially FIGS. 3 and 4).

This motor is a motor operating step by step, with variable and adjustable speed and amplitude.

Figure 2:
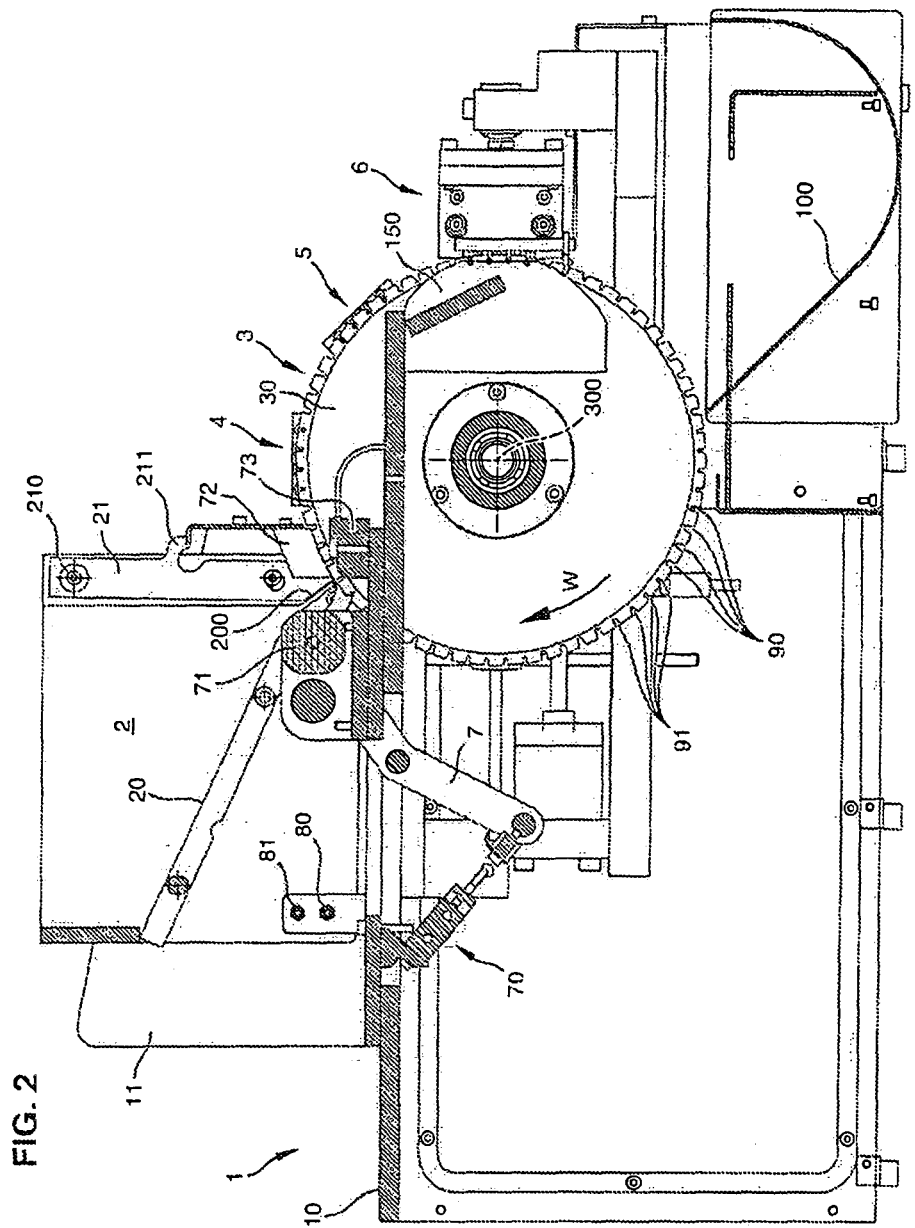
FIGS. 2 and 3 are views in vertical section according to the planes referenced respectively II and III in FIG. 1.
Figure 3:
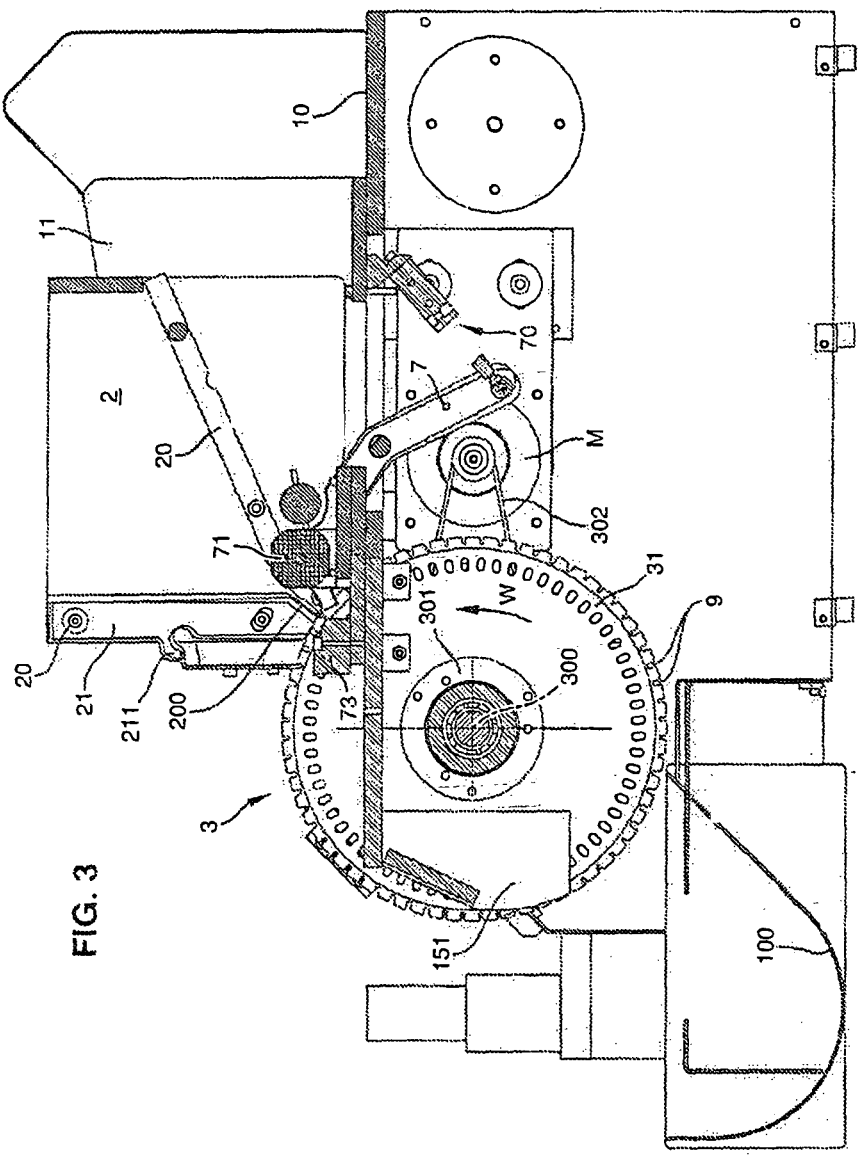
Figure 4:
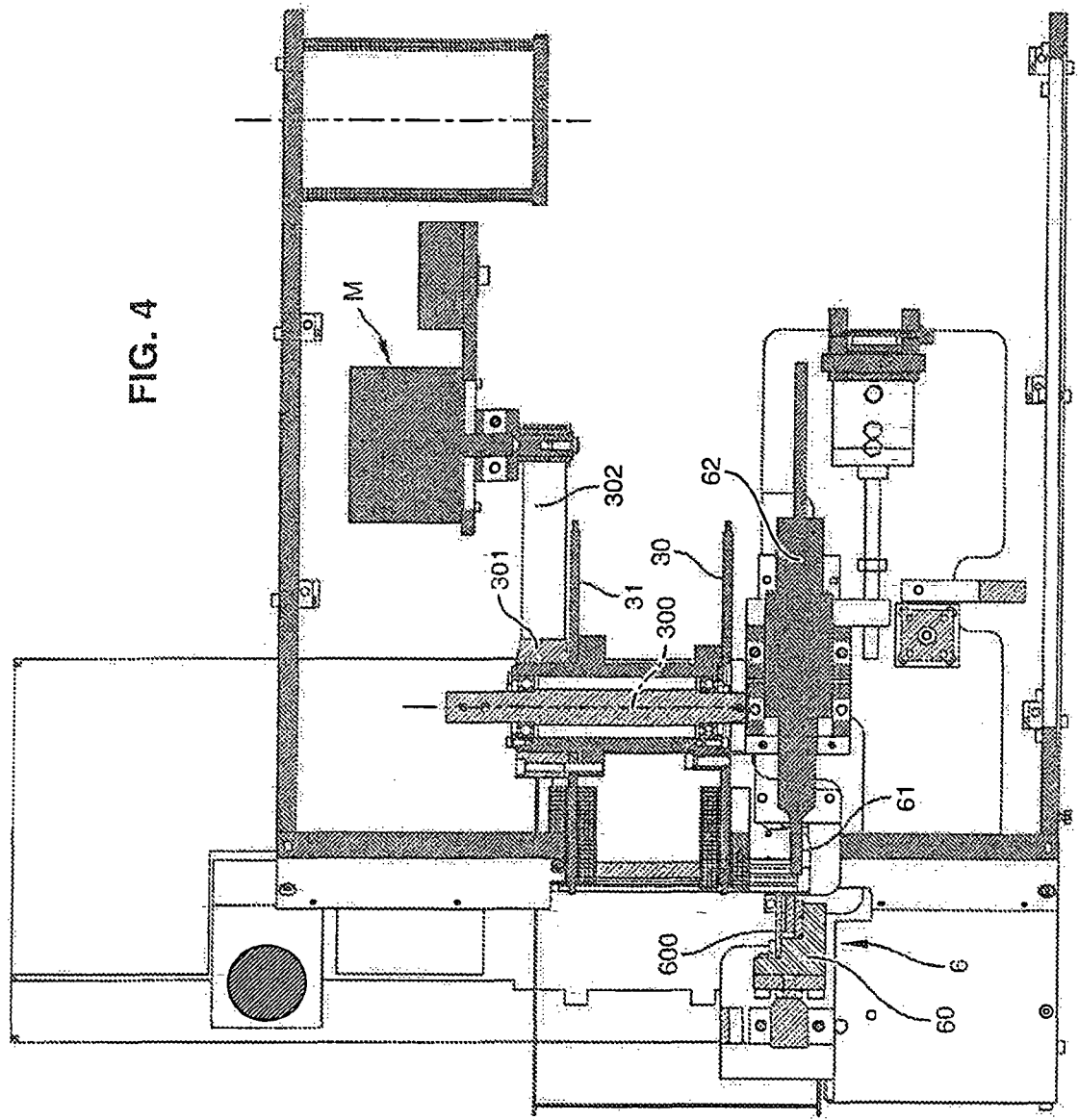
FIG. 4 is a view in horizontal section according to the plane referenced IV-IV in FIG. 1.
Figure 5:
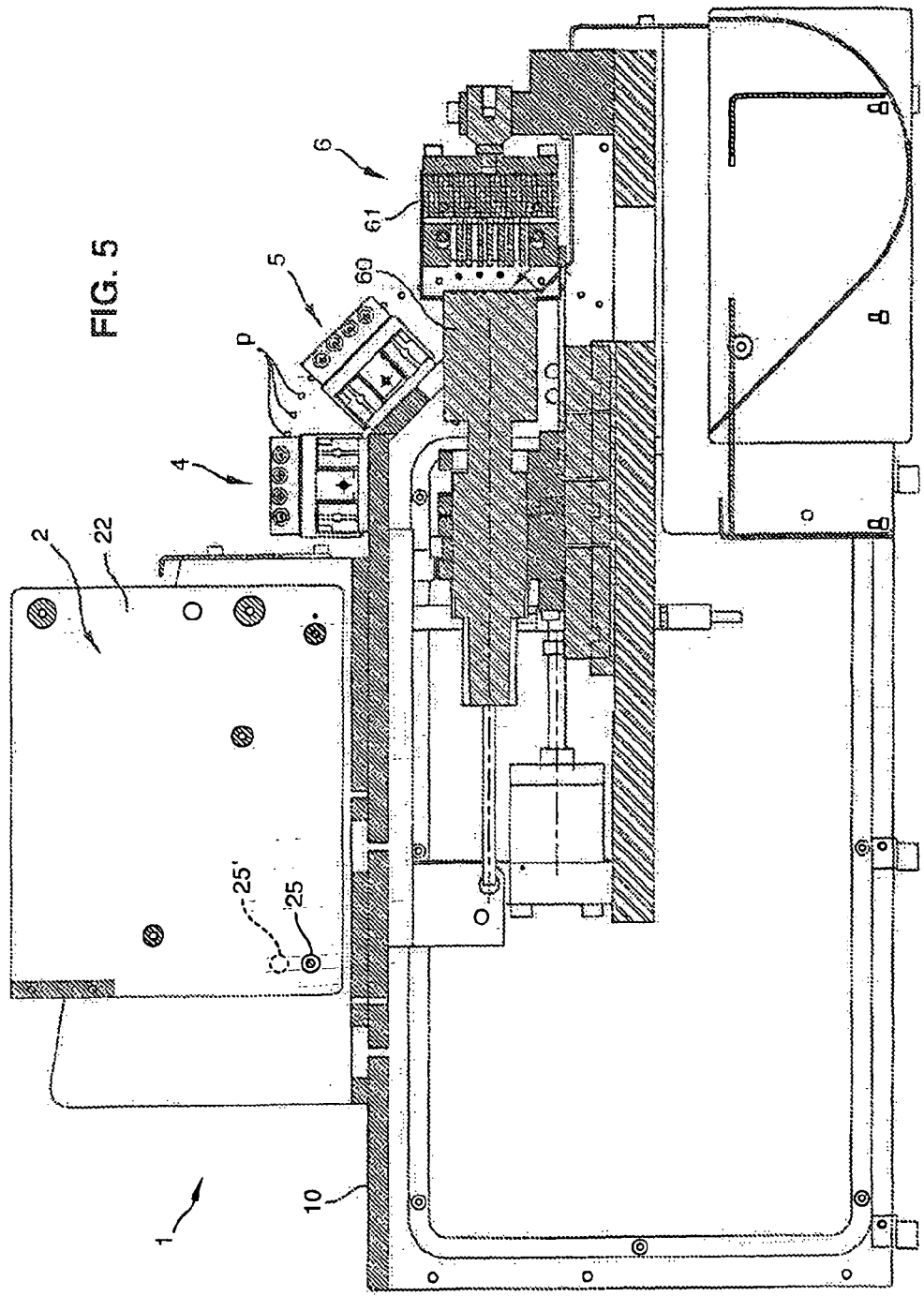
FIG. 5 is a view in vertical section according to the plan referenced V-V in FIG. 1.
Figure 6:
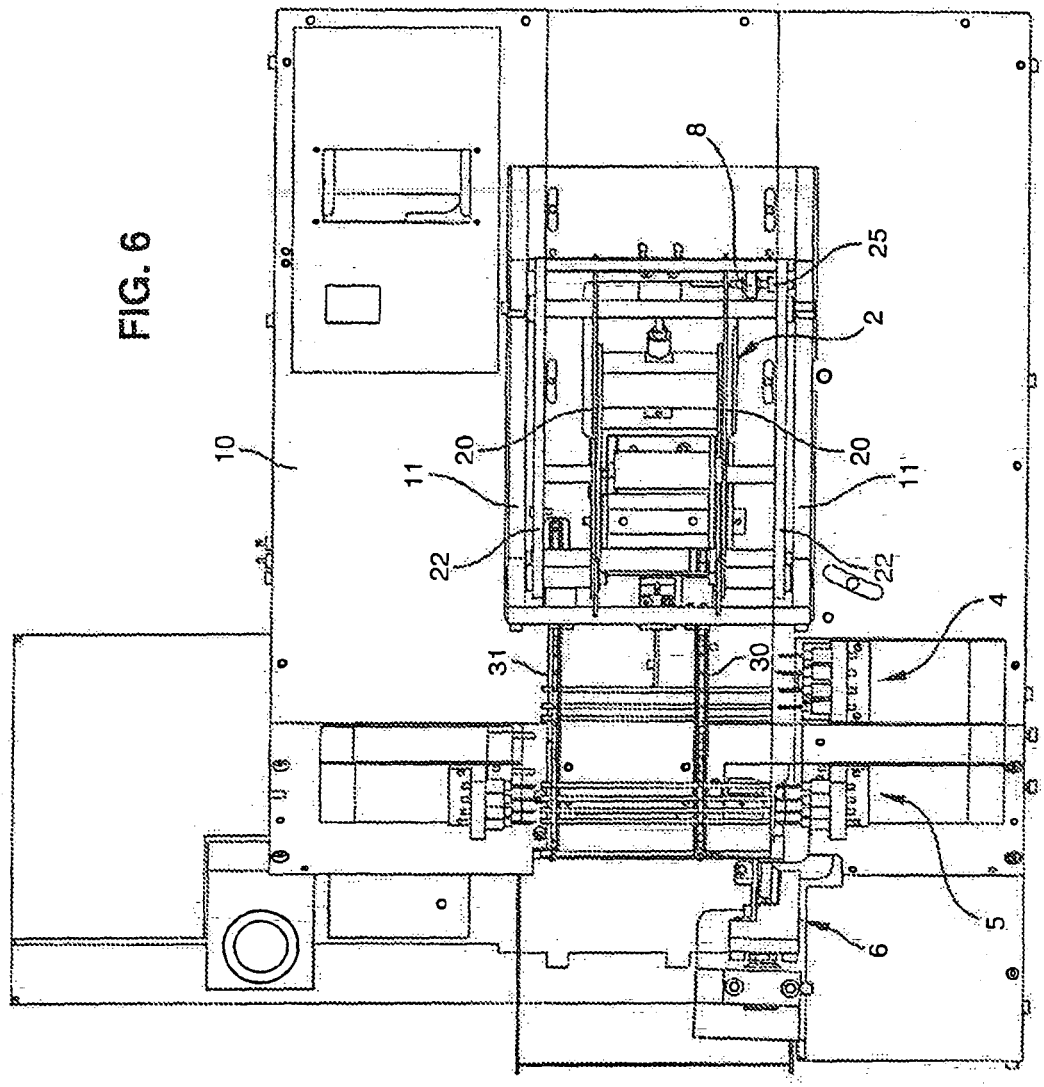
FIG. 6 is a general plan view of the machine.

As is evident in particular from FIGS. 2 and 3, in which the direction of rotation of the barrel is symbolised by the arrow W, the upper ascending zone of this barrel is substantially tangential to the outlet of the channels 200.

These same figures show, in cross-section, a transversal bar, square in cross-section and with truncated angles, placed in the lower zone of the hopper 2 between the guides 20. This bar is mounted to rotate; its function is to stir the straws contained in the hopper to properly align them with the inlet of the exit channels 200.

As is evident from FIG. 1, in which the straws bear reference numeral p, the pair of discs 30-31 is offset laterally relative to the vertical plane of symmetry of the hopper 2.

Also, their mutual clearance is substantially less than the width of the hopper (and therefore than the length of the straws p).

Due to this arrangement, one of the ends of the straws, to be called "distal" (to the left in FIG. 1) does not go beyond, or only slightly so, the disc 31 holding it in place; however, their other end, to be called "proximal" (to the right in FIG. 1) goes considerably beyond the disc 30 holding it in place.

The two discs 30 and 31 are identical.

Their plane is perpendicular to the axis of the straws contained in the hopper 2.

They are provided at their periphery with a plurality of evenly spaced notches 9.

Figure 15:
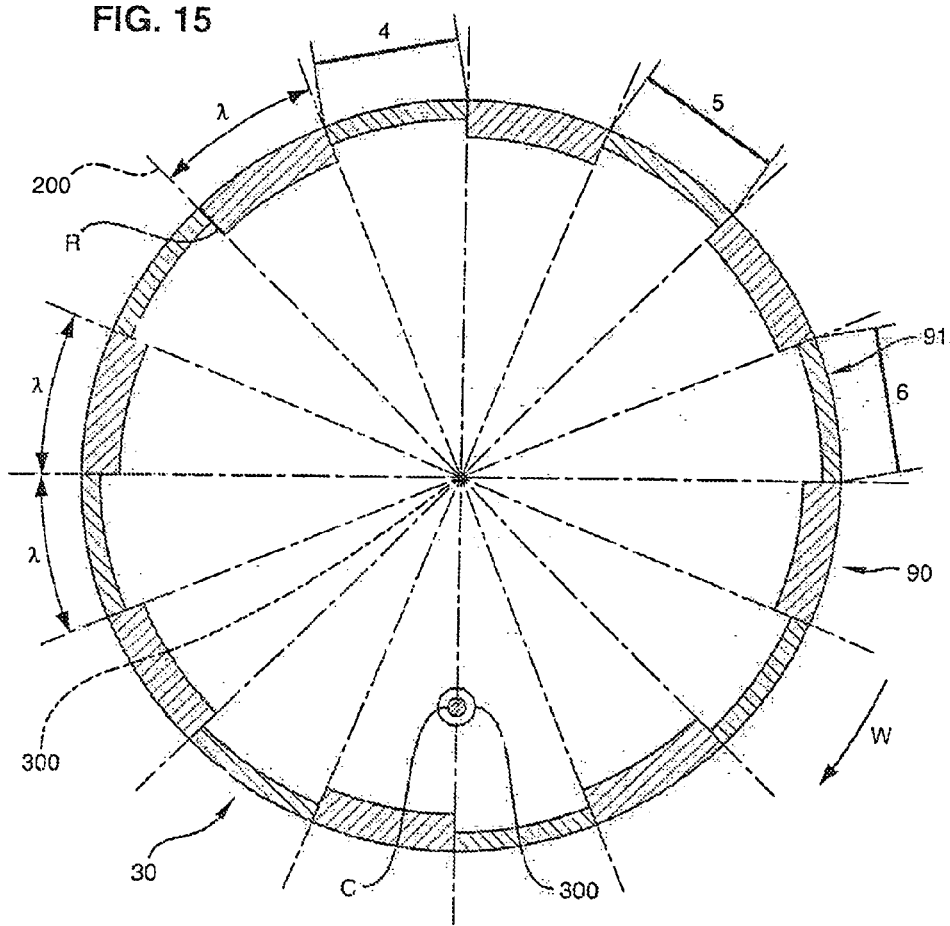
FIG. 15 is a sketch illustrating the configuration of the barrel equipping the machine.
Figure 16:
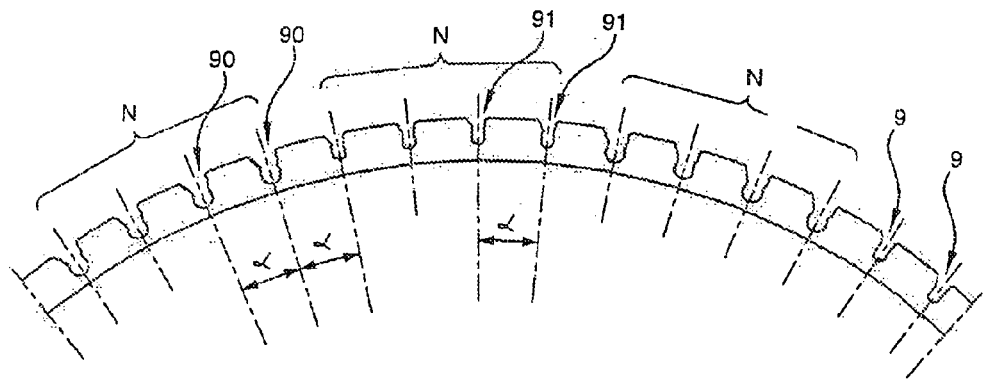
FIG. 16 is a partial view, on an enlarged scale, which illustrates the periphery of a notched disc making up this barrel.

As is evident from FIGS. 15 and 16 there are two series of notches.

In the illustrated embodiment there are 64 notches in total which are subdivided into two series of thirty-two notches adapted to different diameters, specifically large notches 90 for receiving straws p having an external diameter of the order of 3 mm, and small notches 91 for receiving straws p having an external diameter of the order of 2 mm, each series of notches being distributed in eight groups of four notches.

The groups of large notches 90 alternate with the groups of small notches 91, and the axle spacing between two adjacent notches is constant over the entire periphery of the disc and independent of the category of the notch concerned.

The angular spread between the axes of the notches is accordingly 5.625 degrees.

The axle spacing value (developed length of arc of circle) is for example 10 mm.

By way of indication, this corresponds to a disc diameter slightly over 200 mm.

It is understood that the two discs 30 and 31 are set tightly on their hub such that the groups of similar notches are in correspondence.

Figure 19:
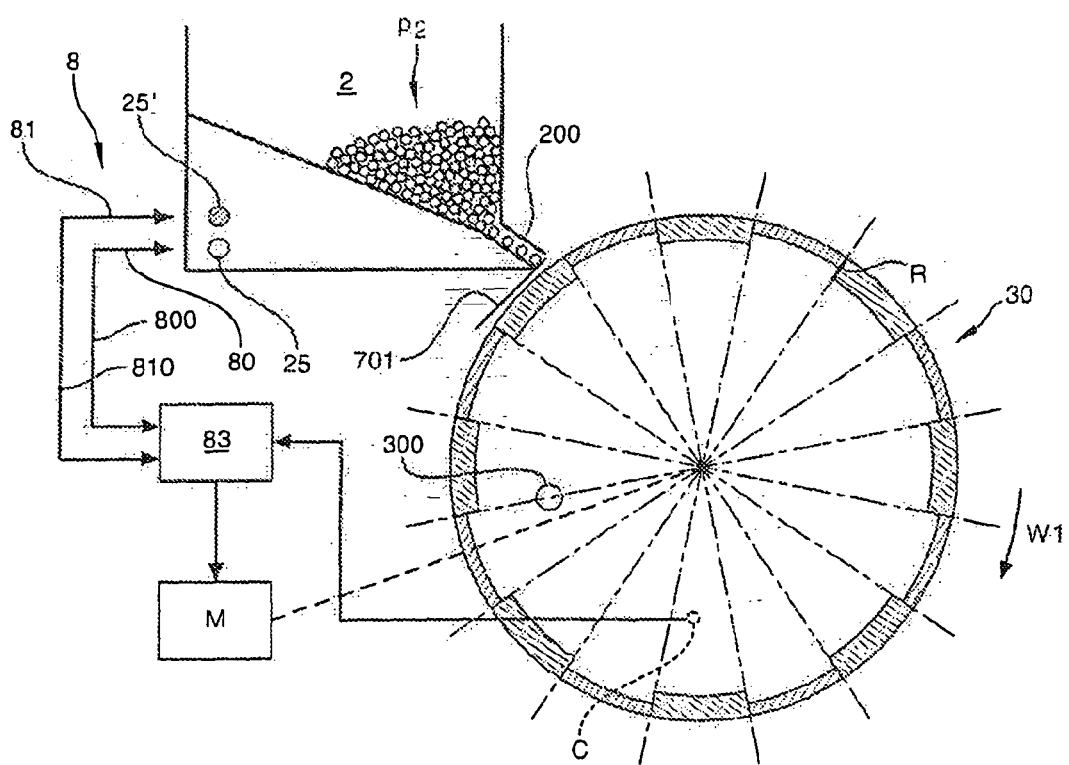
Figure 19:
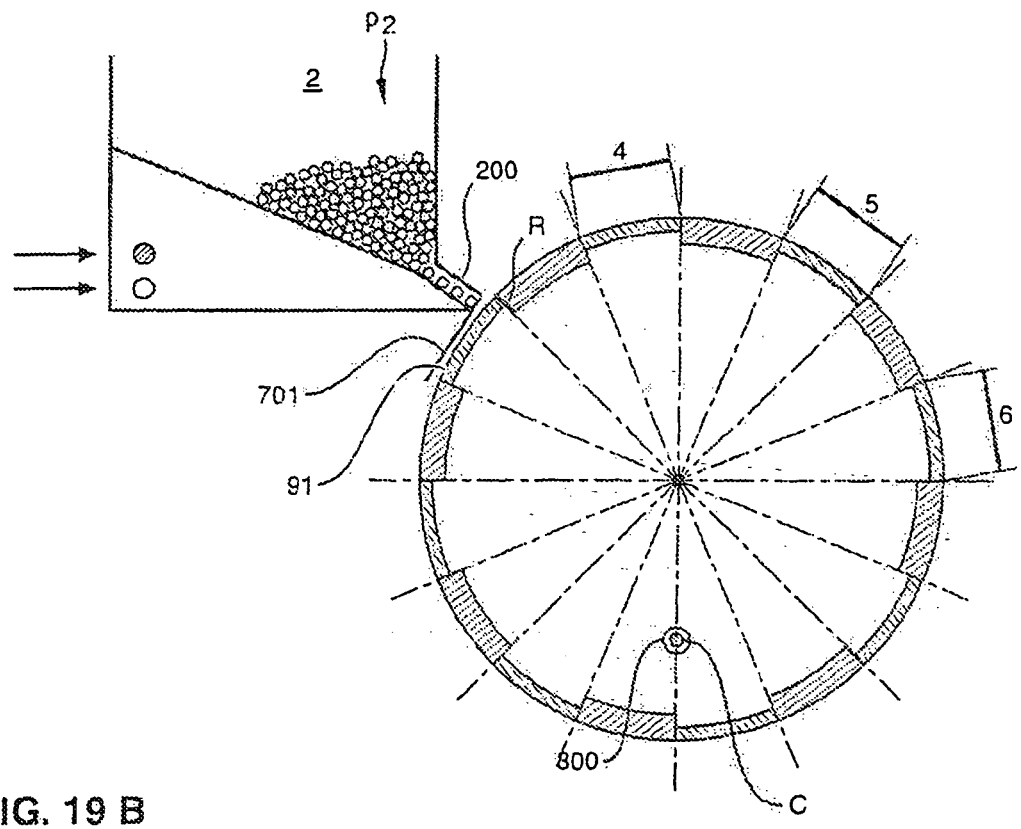
Figure 19:
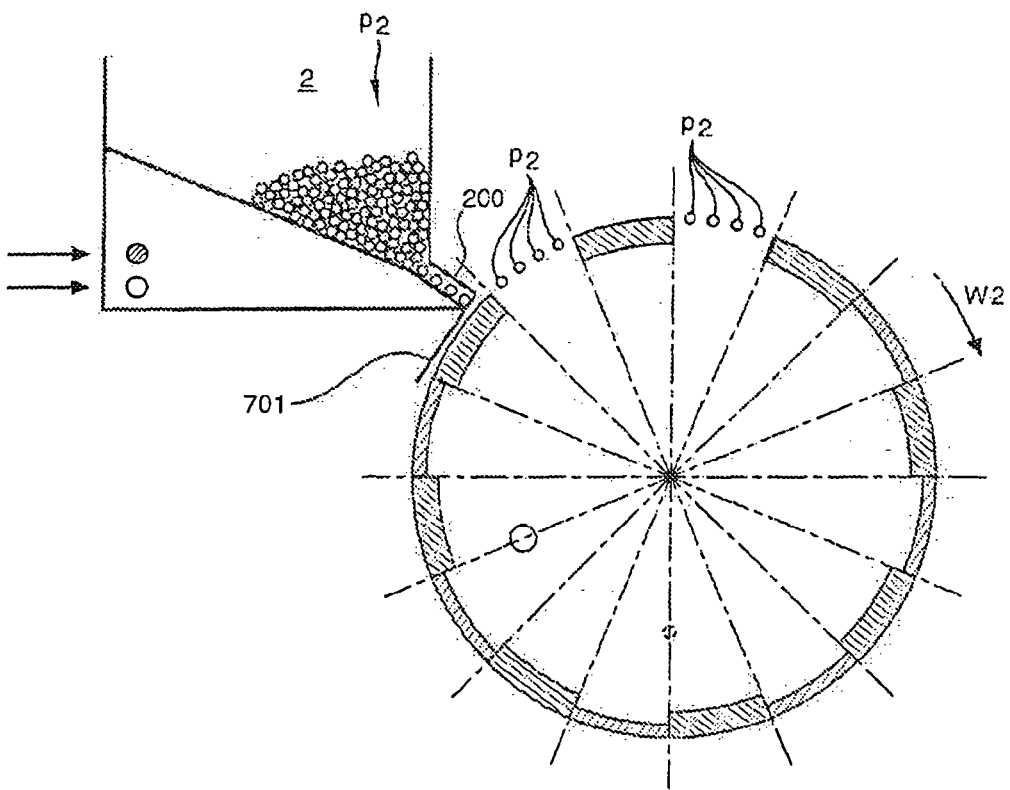

In FIG. 15, and in FIGS. 19, 19A and 19B, thick and thin angular areas symbolise the groups of notches 90 and 91 respectively, with which one of the discs is provided, in this case the disc 30.

Each angular area has the same developed length (length of arc) $\lambda$, whether it comprises small or large notches.

Each of the processing stations 4, 5 and 6 likewise has a width substantially equal to the value $\lambda$, as it is adapted to process all the straws lodged in the notches of an area.

The disc 30 is pierced with an orifice 300 which, during rotation of the disc, scrolls at each turn in front of a fixed sensor C, for example an inductive sensor.

The coinciding of the sensor C and of the orifice 300 corresponds to a "zero" or indexed position of the disc 30, such as a given site of the disc, marked R in FIG. 15, opposite the outlet channel 200 of the hopper 2.

It is supposed that this site corresponds to the first notch of a group of small notches.

The station 4 is located at a developed distance (that is, a length of arc) $\lambda$ from this site R, whereas the stations 5 and 6 are located at a developed distance 3 $\lambda$ and 5 $\lambda$ respectively from the latter.

Figure 17:
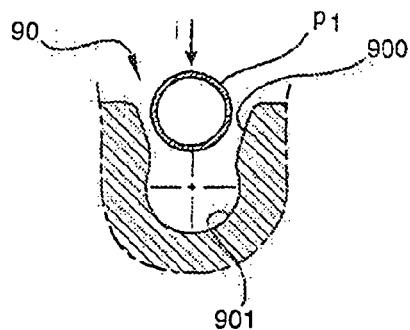
FIGS. 17 and 17A are details illustrating insertion of a large-diameter straw into a notch, respectively during and after its being put in place.
Figure 17A:
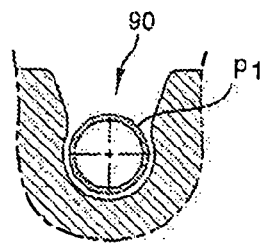
Figure 18:
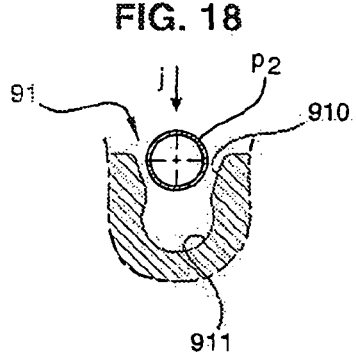
FIGS. 18 and 18A are details illustrating insertion of a small-diameter straw into a notch, respectively during and after its being put in place.
Figure 18A:
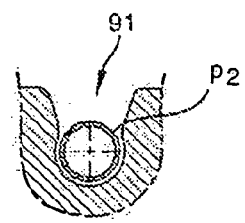

As is evident in FIGS. 17 and 18, the large and small notches 90, 91 have a flared inlet 901, respectively 910, which facilitates centring and penetration of a large-diameter straw p1 (arrow i) and, respectively, of a small-diameter straw p2 (arrow j). They have a substantially semi-cylindrical base zone 901, respectively 911, capable of properly gripping and retaining the straw p1, respectively p2 (FIGS. 17A and 18A).

FIG. 2 shows the presence of fixed ramps 72 (bordering discs 30 and 31), the role of which is to progressively push back each straw which has left the hopper to fit it into its receiving notch.

As is evident in particular in FIG. 2, the operating stations 4, 5 and 6 are placed respectively substantially at the level of the high part of the barrel, towards the middle of its descending upper part and towards the middle of its descending part.

The barrel successively leads a group of four straws, previously taken at the hopper outlet, to each of these stations then stops for a certain period, at least long enough for the longest operation of the three to be completed.

Figure 10:
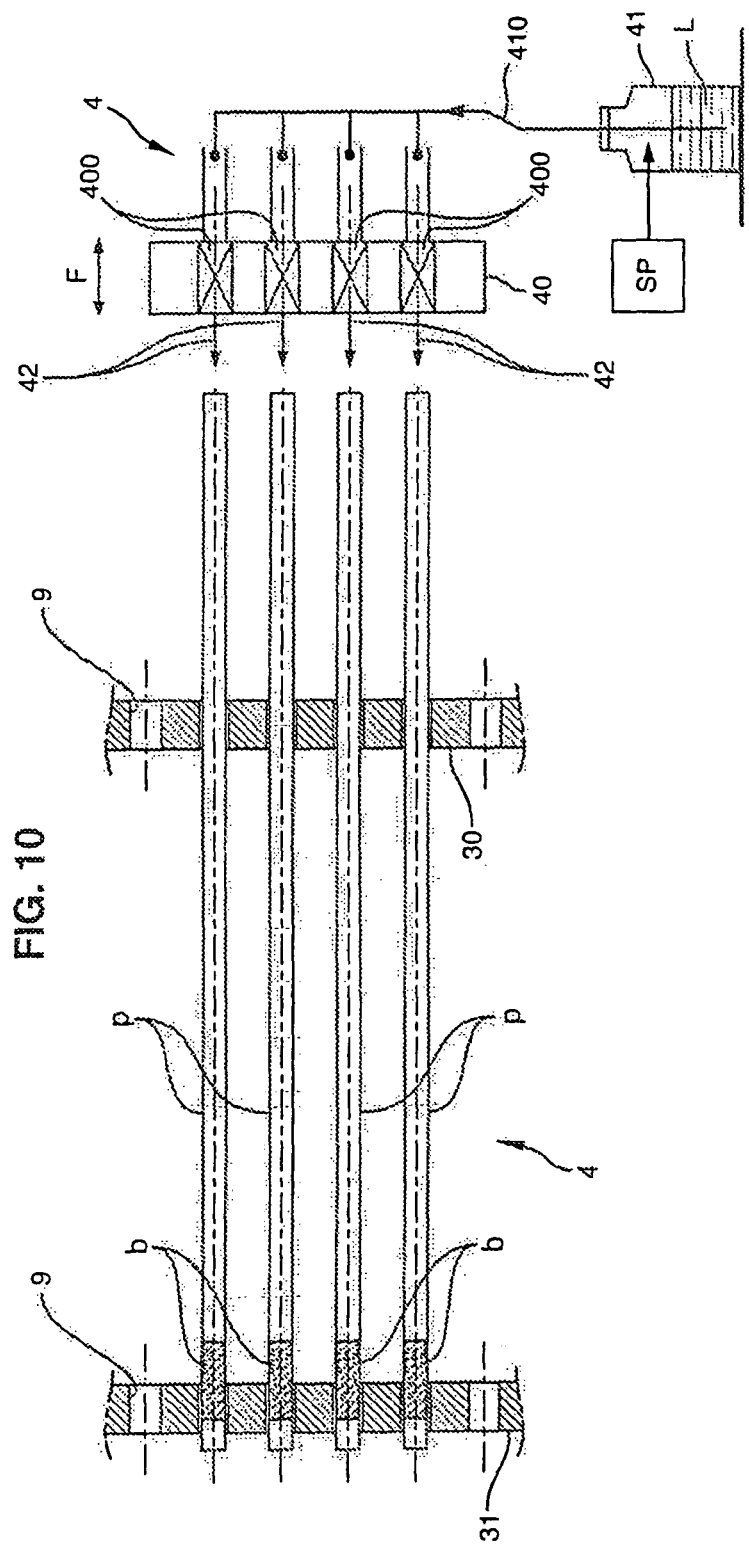
FIG. 10 is a schematic view of the introduction station of a non-spermicidal liquid into the straws.

The operation executed at the station 4 is illustrated in FIG. 10.

A group of four straws p each held in a pair of notches 9 of the discs 30 and 31 is processed here simultaneously.

Their portion of distal end (to the left in the figure) is packed in the inside by a porous stopper b.

In keeping with the ideas of the already cited FR 2,810,535, which could be referred to if needed, with the aim of economising on semen, a small quantity of non-spermicidal and non-adherent liquid is injected at the opposite proximal end.

For this purpose, an injection head comprising an axially mobile slide is used, provided with four hollow needles 42, each adapted to penetrate inside the proximal end of a straw p. This liquid L is contained in an appropriate vial 41, integrated or not in the machine, and pressurised by means of a pressure source SP.

This pressure is relatively low, by way of indication of the order of 20 millibars (2000 Pa).

The vial 41 is connected to the needles 42 by means of flexible conduits 410, via electrovalves 400.

The double arrow F symbolises the reciprocal movement of the slide 40 for introducing the needles 42 into the straws and for withdrawing them once the desired dose of liquid has been deposited.

The volume of this dose is a function of how long it takes to open the electrovalves 400 and of the pressure used to extrude the liquid L.

Figure 11:
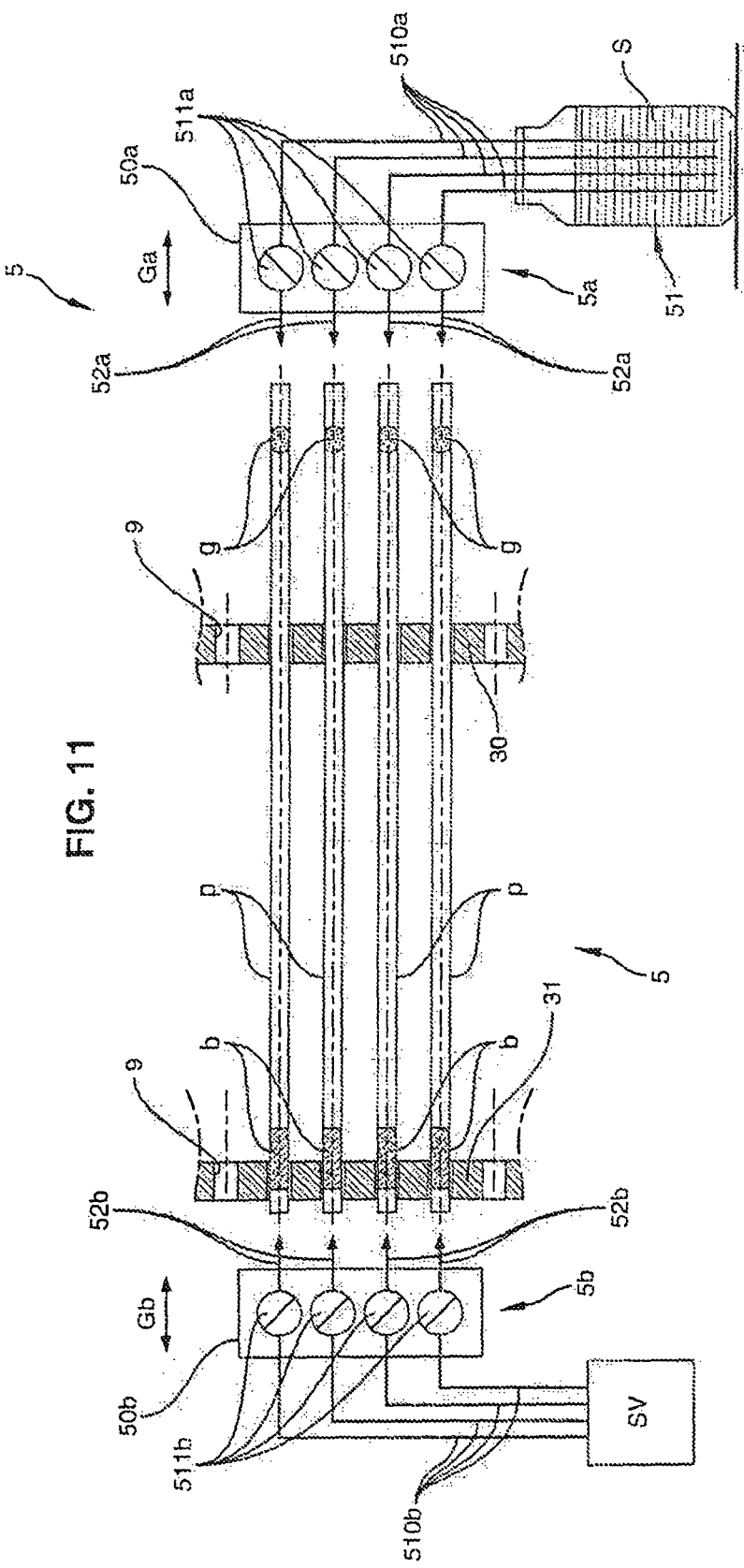
FIG. 11 is a schematic view of the station serving to fill the straws with semen.

The operation executed at the station 5 is illustrated in FIG. 11.

This station comprises two additional sets of tools located at the proximal and distal ends of the straws, whereof the references are marked respectively by the index a and b.

The proximal set of tools comprises an axially mobile slide 50a, the movements of which are symbolised by the double arrow Ga.

This slide carries four hollow needles 52a, each capable of penetrating without clearance (that is, airtight, or almost airtight) into the portion of proximal end of a straw p, in which a drop g of the liquid L has previously been deposited.

The semen S is contained in a container 51, integrated or not into the machine, and connected to the needles 52a by means of flexible conduits 510a via devices for gripping the conduits, or clamps 511a, actuated by electromagnet.

The distal set of tools similarly comprises an axially mobile slide 50b, whereof its shifts are symbolised by the double arrow Gb.

This slide bears four hollow needles 52b each capable of penetrating without clearance (that is, airtight, or almost airtight) into the portion of the distal end of the straw p.

The needles 52b are connected by means of flexible conduits 510b, via clamps 511b actuated by electromagnet, to a vacuum source SV.

The straws are filled by suctioning of the semen at the distal end through their stopper porous b. The semen S penetrates into each straw via the proximal end and progressively pushes the drop g back to the other end, such that it finally comes to soak the stopper b.

The value of the vacuum and the opening time of the clamps 511a and 511b are selected so as to optimise the time necessary for filling the straws.

Figure 12:
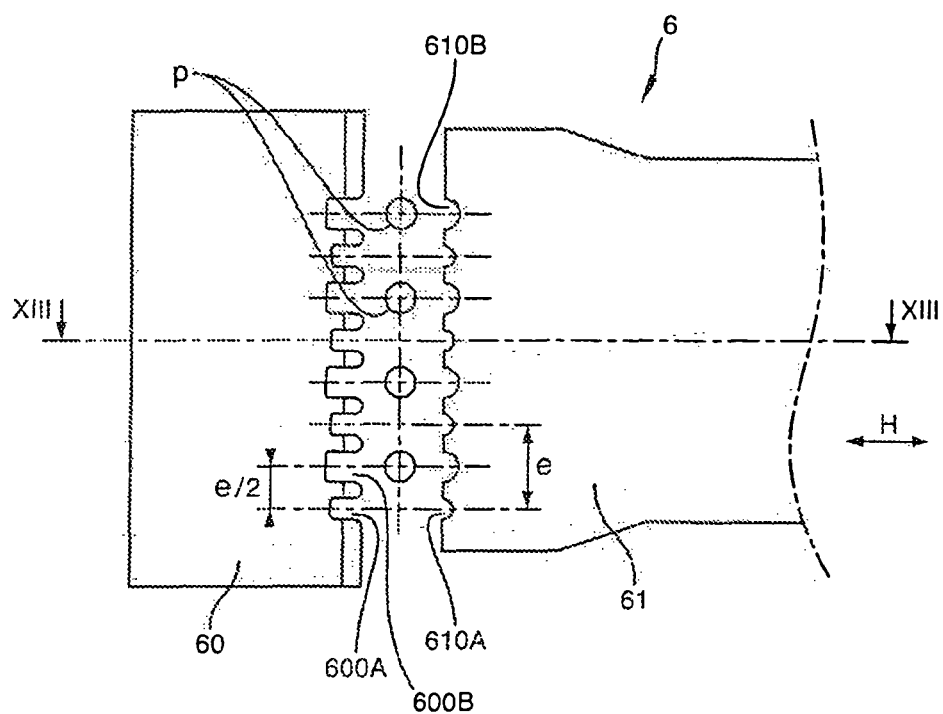
FIG. 12 is a detail which illustrates the ultrasound welding tools of one end of the straws.
Figure 13:
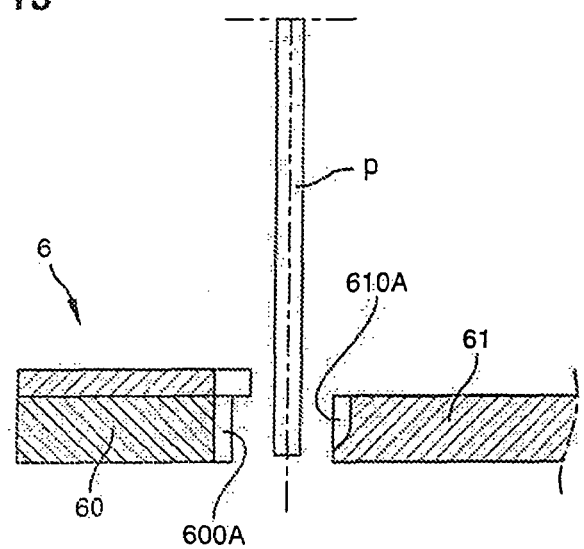
FIG. 13 is a sectional view according to the plane XIII-XIII of FIG. 12.

FIGS. 12 and 13 represent a set of ultrasound welding tools for the proximal end of the straws, located at the station 6.

This set of tools comprises a sonotrode 61 and an anvil 60.

These two elements comprise two series of four additional indentations, one 610A-600A intended for welding small-diameter straws p, the other 610B-600B intended for welding large-diameter straws p.

The sonotrode 61 can be moved towards and away from the anvil 60 by means of an appropriate control member, such as a jack for example, as symbolised by the double arrow H, so as to crimp the end of the straw for welding it and for releasing it after welding.

The indentations of a given category (large or small) are spaced by a value e equal to pitch of the notches, 10 mm for example.

The two series alternate, such that the axle spacing between a small and a large indentation is equal to e/2, or 5 mm for example.

Due to this arrangement, it suffices to shift the pair of tools 60-61 vertically and together on a course of e/2 as a function of the category of the straws concerned so that the latter present correctly vis-à-vis the adequate group of indentations when they arrive at the station 6.

It should be noted that the machine is provided with a pair of profiled ramps 150, 151 located on the edges of the discs 30, respectively 31, in the descending zone corresponding to this station 6 (see FIG. 1).

The ramp 150 located to the proximal side is conformed such that it progressively withdraws the straws from their notch 9, on the disc 30, just before they arrive at the station 6. They are therefore held only by their opposite end embedded in a notch of the disc 31.

Due to this arrangement, the proximal part of the straws has a certain suppleness favouring proper centring in the indentations of the set of welding tools and improves the reliability of the operation.

The ramp 151, as such, ensures subsequent extraction (after welding) of the distal end of the straws from the notches of the disc 31, such that the straws are fully released and fall under the effect of gravity into the receptacle 100.

A computer, referenced 83 in FIG. 19, controls functioning of the machine, in particular the command of the motor M rotating the barrel, the command of the actuating means 70 of the lever 7, synchronising with rotation of the barrel, as well as the set of tools kept at the stations 5, 6 and 7.

In reference to FIGS. 19, 19A and 19B, the way in which the automatic indexing of the barrel as a function of the category of the straws concerned, and how the processing of the straws is carried out, will be explained.

It is assumed that at the outset the barrel is immobilised in any angular position.

The levers 7 occupy a position such that each of their ends 701, symbolised by a segment in FIG. 19, blocks an outlet channel 200 of the hopper.

A hopper 2 packed with a batch of small-diameter straws p2 is placed on the machine.

In this batch, the straws are oriented such that their distal end, fitted with a stopper, is turned to the side of the disc 31.

The detector 8 recognises this "small diameter" category, and sends the computer 83 a corresponding information signal.

These are consequently the groups of small notches 91 which must be utilised to process this batch of straws.

If there is a need for it, the computer also commands displacement of the welding tools 61-60 so that they are placed in the position adapted to closing small-diameter straws.

When the motor M starts up, the computer controls the latter to have it rotate the disc 30 (and therefore the whole barrel), as symbolised by the arrow W1 in FIG. 19, until the orifice 300 moves opposite the sensor C.

The motor is then temporarily stopped in the "zero" position of the disc.

Yet, in this position, illustrated in FIG. 19 A, the mark R is in a position favourable for taking up straws p2, since it corresponds to the first notch of a group of four small notches.

The operation can then commence.

In a first phase, the computer controls the intermittent advance, at low pitch, of the barrel, as well as the alternative opening and closing of the valve 701, such that four straws p2 are placed one after the other in the first group of small notches. The fixed ramp 72 mentioned hereinabove ensures progressive but complete fitting of each straw in the notches.

This "low pitch" is equal to the value of the axle spacing between notches; it corresponds to a rotation of angle α (or 5.625°) of the barrel 3.

In a second phase, the computer controls the closing of the valve 701 as well as the advance of the barrel 3, at a high pitch.

This "large pitch" is equal to the value of the axle spacing λ of an area of notches; it corresponds to a rotation of angle 4α of the barrel 3, or 22.5°.

During this phase, symbolised by the arrow W2 in FIG. 19B, the area of large notches not used passes empty under the hopper outlet 200, whereas the group of four straws p2 arrives at the station 4, and positions itself there, each straw being placed vis-à-vis a needle 42.

In a third phase, the motor M is stopped for a sufficient period so that the operation of introducing a drop of liquid L in each of the straws p2 can be completed correctly.

This process comprising a small-pitch advance phase (with distribution of empty straws), a large-pitch advance phase, and a stop phase, is repeated a first time such that a fresh group of empty straws arrives at the station 4 and the group of straws processed at the station 4 arrives at the station 5.

The operations in these two stations are completed simultaneously during the stop phase of the barrel.

The process is repeated for a second time such that a fresh group of empty straws arrives at the station 4, the group of straws which have just been processed at the station 4 arrives at the station 5, and the group of straws which have just been filled at the station 5 arrives at the station 6.

The operations in these three stations are completed simultaneously during the stop phase of the barrel.

The process is repeated for a third time such that a fresh group of empty straws arrives at the station 4, the group of straws which have just been processed at the station 4 arrives at the station 5, the group of straws which have just been filled at the station 5 arrives at the station 6, and the group of straws which have just been welded at the station 6 is ejected and collected in the receptacle 100.

Cruise control is reached in this way, and this process is then repeated until the quantity of semen is exhausted, semen which originates from a given animal and contained in the container 51 and distributed at the station 5.

By way of indication, a volume of semen corresponding to bull ejaculate fills between 400 and 550 straws approximately.

After the operation, new sterilised tools are substituted for the tools which have been in contact with the semen (needles, electrovalves and flexible conduits in particular) at the stations 4 and 5.

The diameter of the new needles is adapted to the category of the new batch of straws to be processed.

In the event where the new straws are likewise of small diameter, the operation proceeds in the same way as that described hereinabove.

If large-diameter straws which the computer 83 recognises automatically due to the detector 83 are used, the computer modifies the positioning of the welding tools by a semi-pitch (e/2).

Also, the initial indexing of the barrel is modified.

From the position illustrated in FIG. 19A additional rotation corresponding to the angle of an area of notches, or 22.5°, is imparted to the barrel such that this is the first notch of an area of large notches moving vis-à-vis the outlet 200 of the hopper.

From this initial position, the process proceeds exactly as for the previous one, the areas of small notches (not used) this time filing past "empty" in front of the hopper outlet during the "large-pitch" advances of the barrel.

Reference numeral 73 in FIGS. 2 and 3 designates a detector for straws leaving the hopper.

This can be for example a fibreoptic detector for detecting anomalies, in particular the unannounced non-distribution of a straw on the barrel, and supplies a corresponding signal to the computer 83, which then causes the motor to stop immediately.

By way of example, this type of machine is capable of processing around 240 straws per minute.

It is understood that the number and arrangement of the notches are not necessarily the same as those used on the barrel described hereinabove. More than two series of notches of different sizes could be provided, for example three series of notches to allow processing of three categories of straws of different diameters.

Instead of being constituted by a pair of coaxial discs, the barrel could consist of a fluted cylindrical drum comprising two (or more) series of grooves of different width placed according to generatrices of the drum.

The transporter is not necessarily a barrel; it could especially be an endless fluted mat or a pair of endless notched belts.

The invention claimed is:

1. A machine for filling artificial insemination straws with semen, comprising:
   a hopper configured to store empty straws;
   a straw-filling station;
   a transport device provided with elements configured to receive and hold the straws, wherein the transport device is configured to convey straws taken from the hopper and to present the straws taken from the hopper to the filling station, wherein the machine is adapted for processing at least two categories of straws having different diameters, wherein said elements are subdivided into at least two distinct series which can be selectively employed, the elements of one of the two series conforming to adapt to large-diameter straws and the elements of the other of the two series conforming to adapt to small-diameter straws, wherein said transport device is an endless transporter having the elements of both of the at least two series; and a control and command circuit configured to initiate use of the elements of one of the one and the other of the two series while the elements of the other of the one and the other of the two series are inactive during conveyance of the straws.

2. The machine as claimed in claim 1, wherein each of the at least two series of elements comprises a plurality of groups formed from a certain number of adjacent elements of the same respective series, wherein the groups of the one of the two series of elements alternate with the groups of the other of the two series of elements, and wherein the filling station is designed to simultaneously fill a batch of straws supported by a group from the plurality of groups.

3. The machine as claimed in claim 2, wherein the groups of the at least two series of elements each have the same number of respective elements.

4. The machine as claimed in claim 2, wherein said elements are grooves or notches in which the straws are fitted.

5. The machine as claimed in claim 4, wherein axle spacing between the grooves or the notches is constant over an entire length of the transporter, and independent of its respective series.

6. The machine as claimed in claim 1, further comprising an electric motor controlled by the control and command circuit, wherein the motor is configured to operate step by step such that the transport device is capable of being driven with successive and repeated phases of advance, the phases of advance comprising a low pitch, a high pitch of an amplitude multiple to that of the low pitch, and a stop phase.

7. The machine as claimed in claim 1, wherein the transport device is a rotating barrel placed at an outlet of the hopper, wherein the barrel comprises two coaxial discs integral with one another, and wherein the barrel bears said elements.

8. The machine as claimed in claim 1, wherein said hopper comprises means for distributing straws one by one, which are synchronized with an advance of the transport device.

9. The machine as claimed in claim 1, wherein said hopper is removable and comprises means for identification of a category of the straws contained within the hopper, and wherein the machine further comprises a detection device configured to cooperate with said identification means during placement of the hopper so as to automatically determine the category of the straws contained within the hopper.

10. The machine as claimed in claim 9, wherein said detection device is connected to the control and command circuit, wherein the control and command circuit is configured to control a drive motor, and wherein the control and command circuit is configured to index a position of the motor on startup, such that elements corresponding to the category of the straws contained within the hopper are active, the elements not corresponding to the category of the straws contained within the hopper being inactive.

11. The machine as claimed in claim 1, further comprising another station placed upstream of the straw-filling station, wherein straws to be filled at the straw-filling station have distal and proximal ends, the distal ends being blocked by an initially porous stoppers that are capable of becoming watertight when the stoppers are soaked in a liquid, wherein the another station is adapted to introduce a small quantity of non-spermicidal and non-adherent liquid into the straws to be filled at the straw-filling station via the proximal end.

12. The machine as claimed in claim 11, further comprising an ultrasound welding station for the proximal ends of straws filled at the straw-filling station, located downstream of the straw-filling station.

13. The machine as claimed in claim 12, wherein the welding station comprises a sonotrode connected to an anvil, the sonotrode and anvil being provided with complementary indentations for gripping the proximal ends of the straws filled at the straw-filling station, the indentations being subdivided into two alternating groups adapted to weld the small-diameter straws and large-diameter straws, respectively, and wherein the welding station comprises a control member configured to shift the sonotrode and the anvil together in order to make one of the two alternating groups active, and the other of the two alternating groups inactive, as a function of the category of straws to be processed.

14. The machine as claimed in claim 12, wherein the transport device comprises a rotating barrel placed at an outlet of the hopper, wherein the barrel comprises two coaxial discs integral with one another, the discs having notches at their periphery for receiving and holding straws, wherein the machine further comprises two fixed ramps profiled in such a way that one of the two ramps ensures extraction of the proximal ends of the straws from the notches of one of the two discs, just before the straws arrive at the welding station and the other of the two ramps ensures extraction of the distal ends of the straws from the notches of the other one of the two discs, after the straws have left the welding station such that the filled and welded straws fall into a receptacle.

15. The machine as claimed in claim 1, wherein straws to be filled at the straw-filling station have distal and proximal ends, the distal ends being blocked by stoppers initially permeable to air, but capable of becoming watertight when the stoppers are soaked in a liquid, wherein said straw-filling station comprises means for introduction of semen at the proximal end and means for suctioning semen at the distal end through the stoppers.

16. The machine as claimed in claim 1, wherein the transport device comprises a rotating barrel placed at an outlet of the hopper, the barrel comprising two coaxial discs integral with one another, wherein mutual clearance of the two discs is substantially less than a length of the straws, and each of the two discs comprise 64 notches at their periphery for receiving and holding straws, wherein each notch of the two discs comprises a substantially semi-circular base wall and a flared mouthpiece facilitating centering of the straws, wherein said notches of each disc are subdivided into two series of 32 notches, one series of 32 notches being large notches for receiving the large-diameter straws having an external diameter of an order of 3 mm, and the other series of 32 notches being small notches for receiving the small-diameter straws having an external diameter of an order of 2 mm, wherein each of the two series of notches is distributed into eight groups of 4 notches, the 4 groups of large notches alternating with the 4 groups of small notches, wherein an axle spacing between two adjacent notches being constant over the entire periphery of each disc and independent of the series of notch concerned, the axle spacing being of an order of 10 mm.

17. The machine as claimed in claim 1, wherein the elements are subdivided into the at least two distinct series which can be selectively employed such that both series of elements remain on the transport device during processing of straws, regardless of which category of straws is being processed.

18. The machine as claimed in claim 1, wherein the control and command circuit is configured to control a drive motor, and wherein the control and command circuit is configured to index a position of the motor on startup, such that the elements of the one of the one and the other of the two series are active while the elements of the other of the one and the other of the two series are inactive during conveyance of the straws.

\* \* \* \* \*